United States Patent
Klahn et al.

(10) Patent No.: US 8,960,605 B2
(45) Date of Patent: Feb. 24, 2015

(54) SUPPORTING PILLAR FOR AN AIRCRAFT'S STRUCTURAL COMPONENT MANUFACTURED BY A SELECTIVE LASER MELTING PROCESS

(75) Inventors: Christoph Klahn, Hamburg (DE); Rüdy Gysemberg, Hamburg (DE); Olaf Rehme, Hamburg (DE)

(73) Assignee: Airbus Operations GmbH (DE)

( * ) Notice: Subject to any disclaimer, the term of this patent is extended or adjusted under 35 U.S.C. 154(b) by 509 days.

(21) Appl. No.: 13/061,240

(22) PCT Filed: Jul. 30, 2009

(86) PCT No.: PCT/EP2009/059857
§ 371 (c)(1),
(2), (4) Date: Apr. 13, 2011

(87) PCT Pub. No.: WO2010/023059
PCT Pub. Date: Mar. 4, 2010

(65) Prior Publication Data
US 2011/0253878 A1    Oct. 20, 2011

Related U.S. Application Data

(60) Provisional application No. 61/190,373, filed on Aug. 28, 2008.

(30) Foreign Application Priority Data

Aug. 28, 2008  (DE) .......................... 10 2008 044 759

(51) Int. Cl.
*B64C 1/06*    (2006.01)
*B64C 7/00*    (2006.01)
*B64D 11/00*   (2006.01)

(52) U.S. Cl.
CPC . *B64C 7/00* (2013.01); *B64D 11/00* (2013.01); *B64D 2011/0076* (2013.01)
USPC .......................................... 244/131; 29/897.2

(58) Field of Classification Search
USPC .................................. 248/636; 244/131, 133; 280/124.134–124.136; 29/897, 897.3, 29/897.31, 897.33, 897.35
See application file for complete search history.

(56) References Cited

U.S. PATENT DOCUMENTS 2,082,916 A    6/1937  Stratford
2,225,551 A    12/1940 Clinton
(Continued)

FOREIGN PATENT DOCUMENTS

AU    699653 B2    12/1998
CN    101146710 A    3/2008
(Continued)

OTHER PUBLICATIONS

International Search Report and Written Opinion for Application No. PCT/EP/2010/069379 dated Feb. 4, 2011.

*Primary Examiner* — William Gilbert
(74) *Attorney, Agent, or Firm* — Lerner, David, Littenberg, Krumholz & Mentlik, LLP

(57) ABSTRACT

The invention relates to an elongated supporting pillar for a high-strength structural component, wherein the supporting pillar is designed to absorb bending forces that act transversely to a longitudinal direction of extension of the supporting pillar. The supporting pillar comprises a wall which at least partially encloses an elongated cavity of the supporting pillar. A reinforcement structure is arranged within the cavity and transversely to the direction of longitudinal extension in such a manner that the reinforcement structure can absorb at least some of the bending forces. The reinforcement structure is designed integrally with the wall, wherein both the wall and the reinforcement structure comprise a meltable material.

13 Claims, 3 Drawing Sheets

(56) References Cited

U.S. PATENT DOCUMENTS

| | | |
|---|---|---|
| 2,593,714 A | 4/1952 | Robinson |
| 2,877,937 A | 3/1959 | Weir |
| 2,922,262 A | 1/1960 | Atkins |
| 4,444,365 A | 4/1984 | Heuberger |
| 4,603,821 A * | 8/1986 | White ............... 244/54 |
| 4,863,538 A | 9/1989 | Deckard |
| 4,898,756 A | 2/1990 | Oefner |
| 4,938,816 A | 7/1990 | Beaman et al. |
| 5,085,382 A | 2/1992 | Finkenbeiner |
| 5,806,302 A | 9/1998 | Cariola et al. |
| 6,129,311 A | 10/2000 | Welch et al. |
| 6,264,412 B1 | 7/2001 | Nakamura et al. |
| 6,330,985 B1 * | 12/2001 | Manteiga et al. ....... 244/54 |
| 6,708,637 B1 | 3/2004 | Webster |
| 7,182,291 B2 | 2/2007 | Westre et al. |
| 7,641,427 B2 | 1/2010 | Zhang |
| 7,984,547 B2 | 7/2011 | Steinhardt |
| 2005/0104315 A1 | 5/2005 | Howell et al. |
| 2007/0007260 A1 | 1/2007 | Steinhardt |

FOREIGN PATENT DOCUMENTS

| | | |
|---|---|---|
| CN | 101292089 A | 10/2008 |
| DE | 38 27 279 A1 | 2/1990 |
| DE | 4440397 C1 | 9/1995 |
| DE | 19903436 A1 | 8/2000 |
| DE | 10337866 A1 | 3/2005 |
| DE | 60014463 T2 | 10/2005 |
| DE | 102005050143 B3 | 1/2007 |
| EP | 0303821 A1 | 2/1989 |
| EP | 0 354 403 A2 | 2/1990 |
| EP | 1197669 A1 | 4/2002 |
| EP | 1712379 | 10/2006 |
| FR | 2883939 A1 | 10/2006 |
| GB | 303028 A | 4/1930 |
| RU | 2143365 C1 | 12/1999 |

\* cited by examiner ns with the use of conventional manufacturing methods, for example milling, turning or casting, wherein on the one hand the structural component can comprise individual components, e.g. supporting pillars and retaining elements that can be interconnected, e.g. by means of welding or riveting. On the other hand such a structural component can also be made from one block with a correspondingly great amount of machining.

However, it has been shown that by means of these methods freeform areas, undercut areas or cavities can be produced only to a limited extent. Consequently, the components, which are optimised for example by means of a numeric method, need to be designed in such a manner that they can be manufactured in the selected conventional manufacturing methods. A situation thus occurs in which the component geometries that by means of simulation have been shown to be ideal, cannot be realised for reasons connected to manufacturing technology, or that at many positions of the structural component more material remains in place than would be necessary for the transmission of forces. The resulting higher weight is undesirable, in particular in aircraft engineering, because it results in higher energy consumption during the flight phase.

SUPPORTING PILLAR FOR AN AIRCRAFT'S STRUCTURAL COMPONENT MANUFACTURED BY A SELECTIVE LASER MELTING PROCESS

CROSS-REFERENCE TO RELATED APPLICATIONS

This application is a national phase entry under 35 U.S.C. §371 of International Application No. PCT/EP2009/059857, filed Jul. 30, 2009, published in German, which claims the benefit of the filing date of U.S. Provisional Patent Application No. 61/190,373, filed Aug. 28, 2008 and of German Patent Application No. 10 2008 044 759.5 filed Aug. 28, 2008, the entire disclosures of which are hereby incorporated herein by reference.

FIELD OF THE INVENTION

The present invention relates to a supporting pillar for a structural component, for example for an aircraft. In particular, the present invention relates to an elongated supporting pillar for a high-strength structural component, a structural component with a supporting pillar, the use of a structural component in an aircraft, a method for manufacturing a supporting pillar, as well as a computer program element for implementing the method, and a corresponding computer-readable medium.

BACKGROUND TO THE INVENTION

In today's commercial aircraft specially constructed structural components are used at highly stressed positions. The attachment device for a crew rest compartment may be an example of such a structural component, wherein the structural component is on the one hand firmly connected to this compartment, while on the other hand the forces introduced into the structural components can be transmitted to the frame elements of the aircraft by way of tension and compression rods. The structural components can thus, by way of a change in the direction of force, transmit the forces that act on one end to the other end, wherein in the structural component predominantly bending forces are generated. Such structural components are usually manufactured from aluminium alloys or titanium alloys with the use of conventional manufacturing

SUMMARY OF THE INVENTION

Accordingly it is the object of the invention to produce a structural component or a supporting pillar arranged in a structural component in such a manner that bending forces acting on the structural component can be absorbed advantageously and/or can be transmitted in a weight-optimised manner.

This object is met by the subject of the respective independent claims. Further embodiments are described in the respective dependent claims.

According to one aspect of the present invention, an elongated supporting pillar for a high-strength structural component is designed to absorb bending forces that act transversely to a longitudinal direction of the supporting pillar. The supporting pillar comprises a wall which at least in some regions encloses an elongated cavity of the supporting pillar. A reinforcement structure is arranged within the cavity and transversely to the direction of longitudinal extension in such a manner that the reinforcement structure improves flexural rigidity. The reinforcement structure is formed integrally, i.e. in a single piece, with the wall, wherein both the wall and the reinforcement structure are formed with a meltable material.

If elongated hollow bodies enclosed by a wall, for example tubular structures, are subjected to bending forces, these hollow bodies tend to buckle. In a buckling process first the cross section at the buckling position changes. Arranging a reinforcement structure within the cavity at the potential buckling position results in a greater bending force having to be applied at this position for buckling to occur. Consequently, when the same bending force is applied, the safety margin relating to buckling is improved. Furthermore, with this arrangement it is possible, with the same safety margin against buckling, to introduce greater bending force in the supporting pillar according to the invention. Since the wall of the hollow body is also able to absorb part of the bending forces, the wall will preferably be designed so as to be closed.

With the use of meltable material it is possible to produce the supporting pillar with layers that are built one on top of the other and that are interconnected, as will be described later in the context of a production method according to the invention. To this effect any meltable material is suitable, for example plastic or metal.

According to a preferred embodiment of the invention, the reinforcement structure is designed so as to be disc-shaped. In this arrangement the edge delimiting the reinforcement structure or disc can be connected over its entire surface to the wall of the hollow body. The disc is designed so as to be integral with the supporting pillar. As a result of this design, in the case of bending forces occurring, the cross section of the hollow body at the potential buckling position is fully preserved or is at least to a very large extent fully preserved. Thus considerably higher bending force can be introduced into the supporting pillar or can be transmitted by way of the supporting pillar than would be possible without such a disc. Preferably no further supporting component acts on the disc itself.

According to a further preferred embodiment of the invention, the cavity comprises at least one aperture that connects the cavity to a medium that surrounds the supporting pillar. As a result of this, said medium, for example air, can penetrate the cavity and can create pressure equalisation. Consequently such a supporting pillar can, for example, be used at high altitudes or in deep waters, because no pressure differential can build up between the medium and the cavity. Such pressure differentials would result in stress within the supporting pillar, which stress would additionally stress the supporting pillar. Therefore, the bending forces transmittable through a supporting pillar subjected to stress may not be as great as is the case in a supporting pillar that is not subjected to stress.

In an advantageous manner the supporting pillar comprises at least one aperture that is dimensioned in such a manner that a granulate comprising a meltable material, which granulate is required to manufacture the supporting pillar, can be removed from the cavity. As already mentioned above, the supporting pillar can be manufactured by means of a generative layer manufacturing method. In this process, powder or granulate of meltable material is applied in layers, wherein a laser preferably completely melts the contour of the supporting pillar. Since it is in the nature of this manufacturing method for the non-melted granulate to remain on a substrate plate until the supporting pillar has been completed, during the creation of a cavity this granulate is enclosed in this cavity. At least for reasons related to weight and cost it is desirable to remove this granulate from the cavity as completely as possible. This can be achieved by the at least one such aperture.

According to an advantageous embodiment of the invention, such an aperture is arranged in the supporting pillar in the reinforcement structure. In that position the aperture is preferably arranged along the bending line, along which the supporting pillar bends when subjected to bending forces. Thus, the aperture is arranged at a position at which the stress or tension and shear forces, generated by the bending forces, have their lowest value and thus exert the least influence on the component strength. Even if several reinforcement structures divide a cavity into several chambers, these apertures ensure that the chambers are connected among each other and towards the outside without there being any need to penetrate the wall of the supporting pillar for this purpose.

According to a further preferred embodiment of the invention, the wall of the supporting pillar is curved at least in one sub-region. In particular with a view to bending forces that can result in sudden buckling of the supporting pillar, it can be advantageous to design the supporting pillar in a statically non-loaded state in a bent shape. A quarter bend or an S bend can provide an example for this. As a result of this geometric design of the supporting pillar a defined distribution of the force introduced within the supporting pillar can take place. It is thus also possible, by means of a corresponding curvature of the wall of the supporting pillar, to reduce crash loads in a targeted manner. In this arrangement the form of the supporting pillar can be adapted to the static and/or dynamic requirements. Furthermore, for example, the design of the supporting pillar as a tapered pipe or as a supporting pillar with changing cross sections is imaginable, wherein the term "changing cross section" not only refers to the size, for example small diameter or large diameter, but also to the shape, for example a circle or ellipse.

According to a further advantageous embodiment of the invention, in the supporting pillar the thickness of the wall varies. Thus the wall thickness can be adapted to the forces to be absorbed by the supporting pillar. Since with increasing distance from an applied force the stress in the supporting pillar increases, this stress can be compensated for by an increase in the wall thickness. Furthermore, for example, a second force, which is applied at a distance from the first force, and which generates additional stress in the supporting pillar, can be absorbed by local changes in the wall thickness. Thus the wall thickness of the wall of the supporting pillar can change not only over its longitudinal extension but also around its circumference. In this manner the wall thickness of the supporting pillar can be matched to the actually occurring loads.

According to a further expedient embodiment of the invention, the supporting pillar is made from meltable material, wherein the meltable material comprises at least one material from the group comprising stainless steel, tool steel, titanium, aluminium, cobalt, nickel and alloys or mixtures of these materials. With the use of these materials, which are preferably used without binder additives, complete melting of the materials available as powder is possible. Consequently, an approximate 100% component density can result so that a supporting pillar can be manufactured whose mechanical characteristics to the greatest possible extent correspond to the specifications of the material. This means that, for example, in the case of manufacture of the supporting pillar from a titanium alloy the characteristics which form the basis of the corresponding titanium alloy, for example elasticity, can also form the basis of the supporting pillar.

According to a further aspect of the invention, a structural component is formed in a single piece, i.e. integrally, with a supporting pillar. The structural component comprises at least two receiving devices, wherein on one receiving device forces can occur which while generating bending forces at the supporting pillar can be transferred to the other receiving device. As a result of the single-piece design the structural component can be fully made from one material. Moreover, preferably there are no individual parts that subsequently need to be inserted in the structural component. By incorporating the supporting pillar according to the invention in the structural component it is then possible to transfer the forces introduced into the structural component in a weight-optimised manner while utilising all the advantages described in the above paragraphs.

In a further advantageous embodiment of the invention the structural component is topologically optimised according to bionic aspects. Such optimisation means that freeform structures can be created which in relation to mechanical, thermal, electrical, acoustic, filtering and surface-related characteristics meet the requirements. The design of this can incorporate and copy to the largest extent possible examples from nature, for example as provided in the case of long bones.

In a further advantageous embodiment of the invention the structural component is formed with a supporting pillar. In this arrangement an additional structural support is connected to the wall of the supporting pillar. The reinforcement structure within the cavity of the supporting pillar is arranged in such a manner that the reinforcement structure introduces the bending force occurring in the supporting pillar in such a manner to the structural support that as a result of the reinforcement structure any buckling of the supporting pillar is rendered more difficult.

According to a further aspect of the invention, a structural component as described above is used in an aircraft.

According to a further aspect of the invention, a supporting pillar is manufactured by means of a generative layer manufacturing method, in particular by means of a selective laser melting method. In this way a wall is formed that at least partially encloses an elongated cavity of the supporting pillar. Furthermore, a reinforcement structure within the cavity and transversely to a direction of longitudinal extension of the supporting pillar is formed in such a manner that the reinforcement structure can absorb at least some of the bending forces acting on the supporting pillar. In addition, the reinforcement structure is formed integrally with the wall, wherein both the wall and the reinforcement structure are made from a meltable material by means of the layer manufacturing method.

In this arrangement the supporting pillar can be built layer by layer, wherein in each case a layer comprising powdery material can be applied to an already processed part of the supporting pillar before it is locally melted so that during subsequent solidification it can conjoin the aforesaid. For example by means of laser rays any three-dimensional geometries, including those with undercuts, can be produced. It is thus possible to manufacture a supporting pillar which cannot be produced in conventional mechanical or casting production processes. As a rule, manufacture of the product requires the product's geometric data to be available in three dimensions and to be processed as layer data. From the present CAD data of the component, numerous layers are produced by so-called slicing.

According to a further aspect of the invention, a computer program element is provided, which when executed on a computer-controlled device for carrying out a generative layer manufacturing method is designed to implement the method described above for manufacturing a supporting pillar.

According to a further aspect of the invention, a computer-readable medium with a computer program element stored thereon can be used for implementing a generative layer design for the manufacture of a supporting pillar.

Further details and advantages of the invention are stated in the subordinate claims in connection with the description of an exemplary embodiment that is explained in detail with reference to the drawings.

DETAILED DESCRIPTION OF EXEMPLARY EMBODIMENTS

Figure 1:
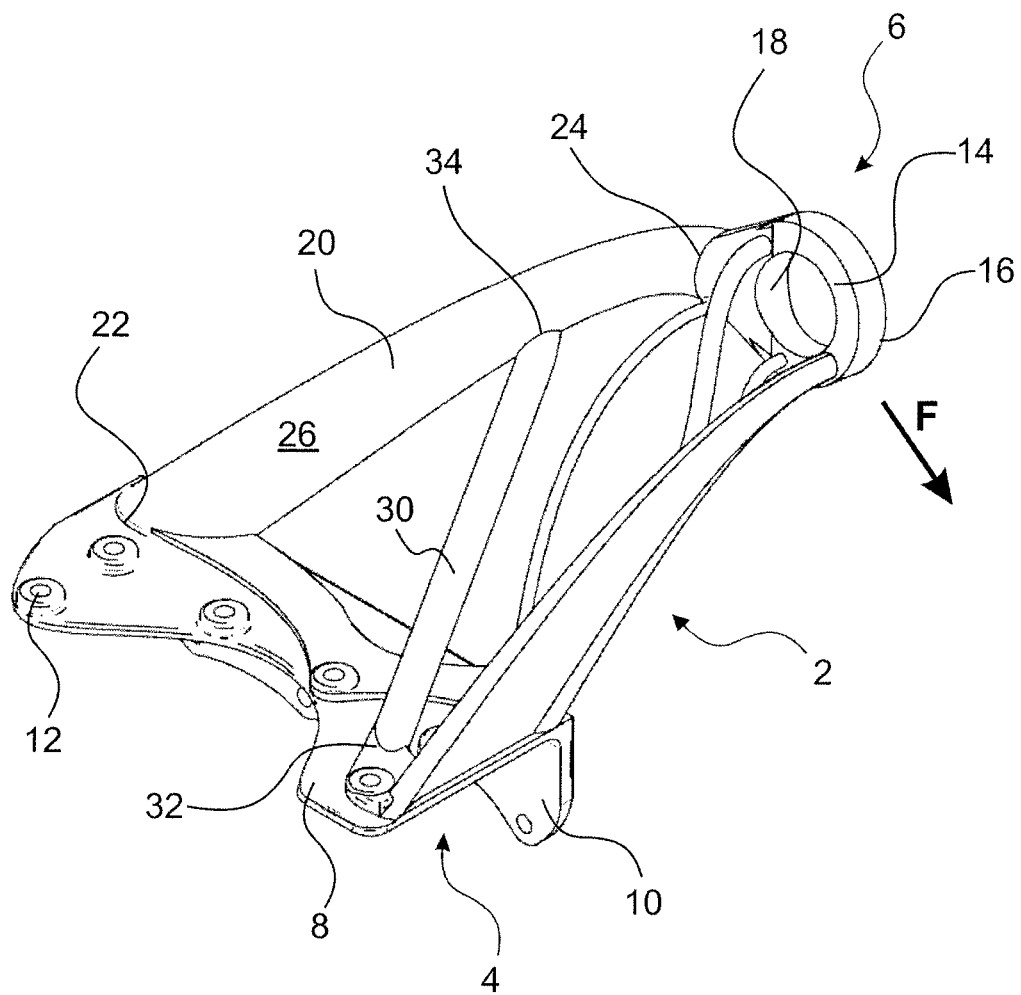
FIG. 1 shows a three-dimensional view of a structural component with an elongated supporting pillar according to the invention.

It should be mentioned that identical components in the figures have the same reference characters, and that the drawings are merely diagrammatic and not necessarily true to scale.

FIG. 1 shows a structural component 2 which essentially comprises an bracket 4 and an eye 6. The bracket 4 comprises two legs 8, 10 that are arranged perpendicularly to each other, which comprise mounting holes 12. By means of suitable mounting material that is inserted through the mounting holes 12 the bracket 4 is affixed to a crew rest compartment 52 (see FIG. 3).

The eye 6 comprises two plane parallel plane sides 14, 16. At a right angle to the plane sides 14, 16 the eye 6 comprises a through-hole 18 in which there is a shock-mount element (not shown) which is connected in an articulated manner to a tension-compression rod 19 (see FIG. 3). The eye 6 is arranged in such a manner relative to the bracket 4 that the plane sides 14, 16 extend along a direction F so as to be plane parallel to one leg 10 of the bracket 4, and transversely to the direction F encompass an angle of approximately 10°.

Figure 2:
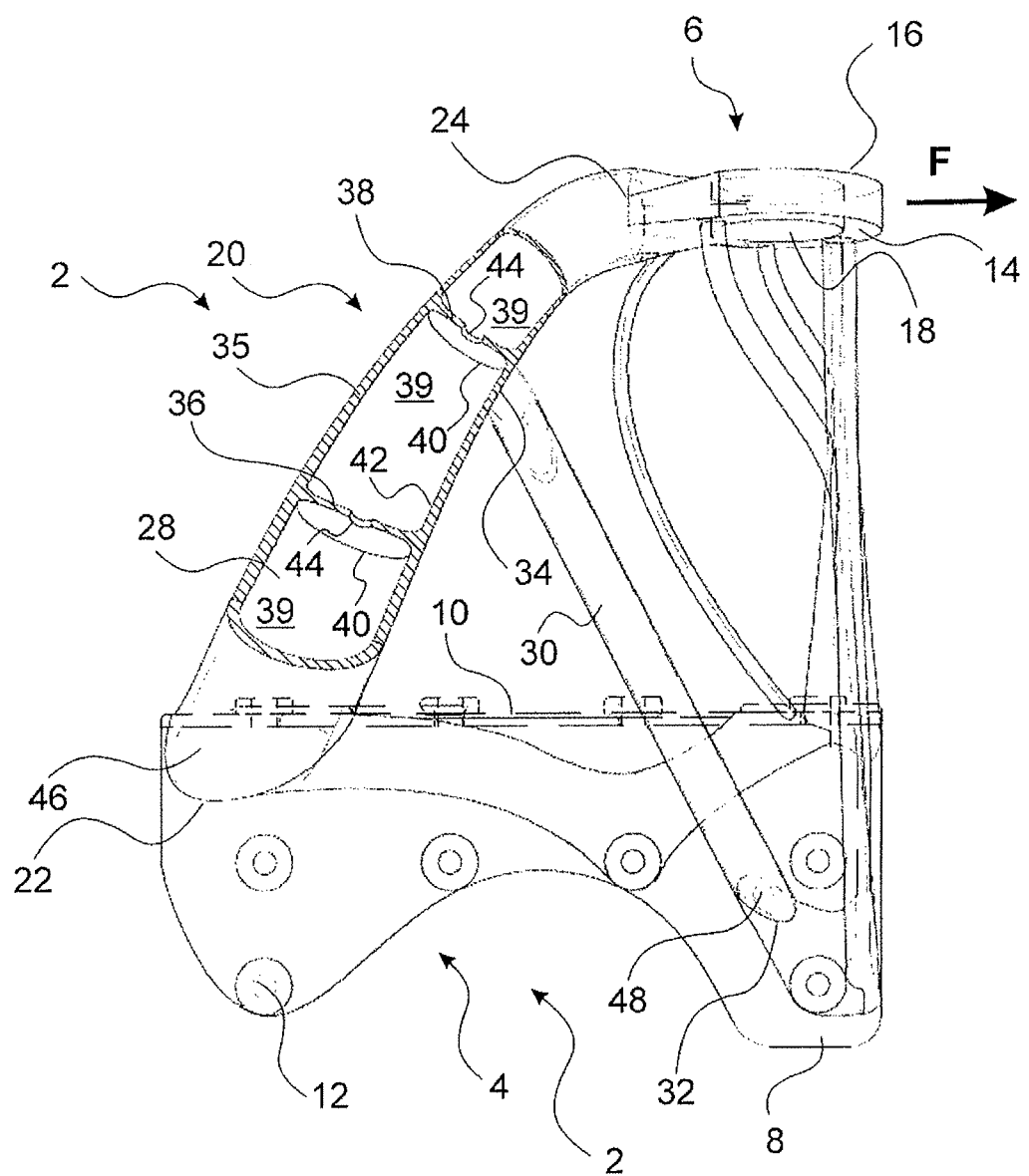
FIG. 2 shows a lateral view of the structural component of FIG. 1 with a partial elevation of the elongated supporting pillar according to the invention.

The eye 6 is essentially rigidly connected to the bracket 4 by way of a supporting pillar 20. To this effect the bottom edge 22 of the supporting pillar 20 adjoins the leg 8 of the bracket 4, while the top edge 24 of said supporting pillar 20 adjoins the eye 6. The supporting pillar 20 comprises a wall 26 that encloses a cavity 28 (see FIG. 2). The supporting pillar 20 resembles a conically bent pipe, wherein the largest diameter is at the lower edge 22, while the smallest diameter is at the top edge 24. The supporting pillar 20 encompasses an acute angle to the leg 8 of the bracket 4. At its bottom part the supporting pillar 20 is slightly curved in the direction of the eye 6, while at its top part towards the eye 6 the curvature is increased.

A structural support 30, which is designed as a straight pipe, rests with its bottom edge 32 on the leg 8 of the bracket 4. Its top edge 34 is firmly connected to that part of the wall 26 of the supporting pillar 20 which part faces the bracket 4.

The thickness 35 of the wall 26 of the supporting pillar 20 gradually decreases from the bottom edge 22 to the top edge 24. In addition, the cavity 28 is divided into three chambers 39 by two reinforcement structures in the form of a bottom disc 36 and a top disc 38. Both discs 36, 38 are arranged transversely to the direction of longitudinal extension of the supporting pillar 20. To this effect the discs 36, 38 comprise edges 40 which over their entire surface and in one piece are connected to an inside 42 of the wall 28. In addition, the discs 36, 38 comprise an aperture 44 that extends along the bending line of the supporting pillar. By means of these apertures 44 the chambers 39 are interconnected. Furthermore, the leg 8 within the lower edge 22 comprises an opening 46 by means of which the cavity 28 of the supporting pillar 20 is connected to the medium that surrounds the supporting pillar 20. The structural support 30, which is designed as a pipe, within its bottom edge 32 also comprises an opening 48 in the leg 8.

A tension force or compression force introduced at the eye 6 in the direction F exerts bending forces on the supporting pillar 20, which bending forces manifest themselves in transverse forces that occur transversely to the direction of longitudinal extension of the supporting pillar 20. These transverse forces can result in buckling of the supporting pillar 20 and thus to failure of the structural component 2. Buckling, for example of a pipe, is preceded by a change in the cross section. Consequently, maintaining the cross section at the buckling position means that with the same input of transverse force this pipe does not buckle, or that the input of transverse force needs to be increased in order to buckle the pipe. For this reason the top disc 38 is positioned in such a manner in relation to the structural support 30 that the top disc 38 maintains the cross section of the supporting pillar 20 at the position that is most prone to buckling. Thus in a weight-optimised design of the supporting pillar 20 the introduced transverse forces can be absorbed and passed on.

Manufacturing the structural component 2 takes place by a selective laser melting process. In this process, by means of so-called "slicing" based on existing CAD data, the structural component 2 is generated by means of numerous layers. Thus the entire structural component 2 is made in a single piece.

A powder or granulate is applied to a building platform by means of, for example, a squeegee or doctor blade over the entire area 0.001 to approximately 0.2 mm in thickness. By controlling the laser beam according to the sliced contour of the supporting pillar the layers are melted step-by-step in the powder bed. A building platform is then slightly lowered and a new layer is applied. The powder is provided by lifting a powder platform or as a supply in the squeegee. Layering takes place in vertical direction. The energy which is supplied by the laser is absorbed by the powder and leads to locally limited melting of particles.

Since in the selective laser melting method the individual layers are melted by controlling a laser beam in a powder bed, the powder remains in cavities, and after completion is removed through corresponding openings. In the structural component 2 for complete removal of the powder from the cavities 28 or hollow chambers 39, to this effect the apertures 44 or openings 46, 48 are provided.

For example a titanium alloy TiAl6V4 can be used as a material to manufacture the structural component 2.

Figure 3:
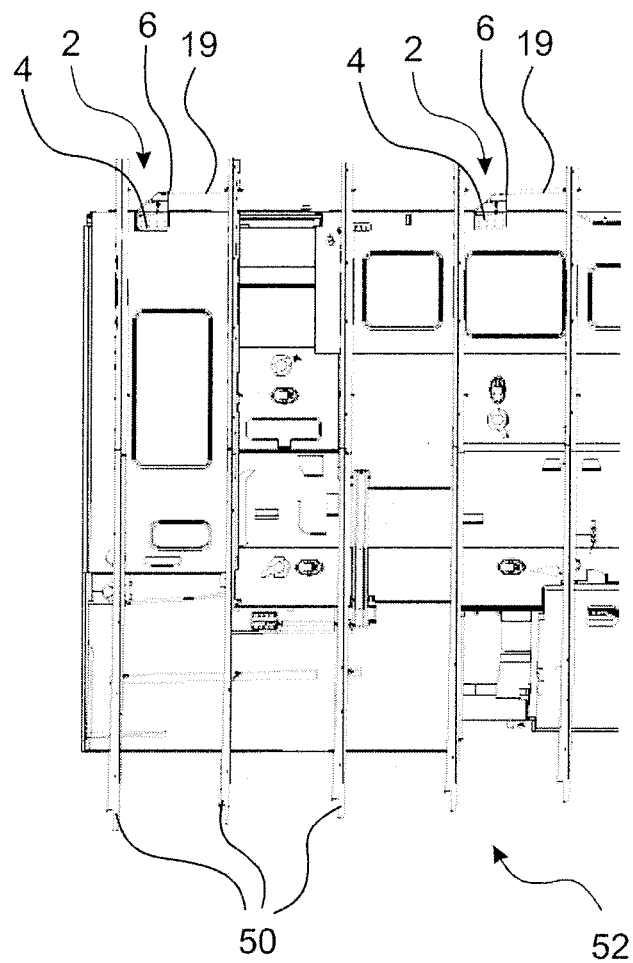
FIG. 3 shows part of the ceiling of a crew rest compartment, viewed from the outside, with the structural component according to the invention.

FIG. 3 shows part of the ceiling of the crew rest compartment 52 viewed from the outside. Between the frame elements 50 there are two structural components 2 to whose bracket 4 the crew rest compartment 52 has been attached. By way of the eye 6 the structural components 2 are connected to one end of the tension-compression rod 19. The other end is connected in an articulated manner to the frame element 50.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2 Structural component
4 Bracket
6 Eye
8 Leg
10 Leg
12 Mounting hole
14 Plane side of the eye
16 Plane side of the eye
18 Through-hole
19 Tension-compression rod
20 Supporting pillar
22 Bottom edge of the supporting pillar
24 Top edge of the supporting pillar
26 Wall
28 Cavity
30 Support
32 Bottom edge of the support
34 Top edge of the support
35 Thickness
36 Bottom disc
38 Top disc
39 Chamber
40 Edge
42 Inside
44 Aperture
46 Opening
48 Opening
50 Frame element
52 Crew rest compartment
F Direction

The invention claimed is:

1. A curved elongated supporting pillar for a high-strength structural component, which is configured to absorb bending forces that act transversely to a longitudinal direction of the supporting pillar, the supporting pillar comprising:
a wall at least partially enclosing an elongated cavity of the supporting pillar and forming a tubular structure;
a disc-shaped reinforcement structure arranged within the elongated cavity and transversely to the longitudinal direction of the elongated supporting pillar to improve flexural rigidity;
wherein the reinforcement structure is formed integrally with the wall,
wherein both the wall and the reinforcement structure are formed from a meltable material, and
wherein a thickness of the wall decreases from a first end of the supporting pillar to a second end of the supporting pillar.

2. The supporting pillar of claim 1, wherein the elongated cavity comprises at least one aperture connecting the elongated cavity to a medium surrounding the supporting pillar.

3. The supporting pillar of claim 2, wherein the at least one aperture is dimensioned for allowing removal of a granulate comprising a meltable material from the elongated cavity, the granulate being used to manufacture the supporting pillar.

4. The supporting pillar of claim 2, wherein the at least one aperture is arranged in the reinforcement structure.

5. The supporting pillar of claim 1, wherein the wall is curved at least in one sub-region.

6. The supporting pillar of claim 1, wherein the thickness of the wall varies.

7. The supporting pillar of claim 1, wherein the meltable material comprises at least one material selected from the group consisting of stainless steel, tool steel, titanium, aluminium, cobalt, nickel, alloys and a combination thereof.

8. The supporting pillar of claim 1, wherein the disc-shaped reinforcement structure includes a peripheral edge and is connected over an entire surface of the peripheral edge to an inside surface of the wall.

9. The supporting pillar of claim 1, wherein the supporting pillar has a conical shape, wherein a first end of the supporting pillar is wider than a second end of the supporting pillar.

10. The supporting pillar of claim 1, wherein the reinforcement structure is proximal to a first end of the supporting pillar, wherein a first distance between the reinforcement structure and the first end is less than a second distance between the reinforcement structure and a second end of the supporting pillar.

11. The supporting pillar of claim 1, wherein one of the first and second ends of the supporting pillar is open to connect the cavity enclosed by the wall with a medium surrounding the supporting pillar.

12. A structural component comprising a supporting pillar comprising:
a wall at least partially enclosing an elongated cavity of the supporting pillar and forming a tubular structure;
a disc-shaped reinforcement structure arranged within the elongated cavity and transversely to the longitudinal direction of the elongated supporting pillar to improve flexural rigidity;
wherein the reinforcement structure is formed integrally with the wall,
wherein both the wall and the reinforcement structure are formed from a meltable material,
wherein the structural component is formed integrally with the supporting pillar and wherein the structural component comprises at least first and second receiving devices,
wherein forces exerted on the first receiving device are transferred to the second receiving device while also generating bending forces at the supporting pillar, and
wherein a thickness of the wall decreases from a first end of the supporting pillar to a second end of the supporting pillar.

13. The structural component of claim 12, further comprising a structural support connected to the wall of the supporting pillar; and
wherein the reinforcement structure within the elongated cavity of the supporting pillar is arranged such that the reinforcement structure resists the bending force exerted on the supporting pillar to inhibit buckling of the supporting pillar.

* * * * *